Feb. 17, 1942.  W. M. BRYAN ET AL  2,273,462
DEMONSTRATING DEVICE
Filed July 9, 1940   2 Sheets-Sheet 1

Inventor
William M. Bryan
William F. Peters

By

Attorney

Feb. 17, 1942.  W. M. BRYAN ET AL  2,273,462
DEMONSTRATING DEVICE
Filed July 9, 1940   2 Sheets-Sheet 2

Inventor
William M. Bryan
William F. Peters

Attorney

Patented Feb. 17, 1942

2,273,462

UNITED STATES PATENT OFFICE 2,273,462

DEMONSTRATING DEVICE

William M. Bryan, St. Petersburg, and William F. Peters, Miami, Fla., assignors to Wingfoot Corporation, Wilmington, Del., a corporation of Delaware Application July 9, 1940, Serial No. 344,538

13 Claims. (Cl. 35—49)

The present invention relates to a demonstrating device for demonstrating comparatively the characteristics of inner tubes for pneumatic tires and the like.

One object of the invention is to provide in a device of this character a mounting for a tire in which the tube to be demonstrated is to be placed, and preferably to provide at least two such supports in order that two tubes may be demonstrated substantially simultaneously or in rapid succession.

Another object of this invention is to provide a device for comparing inner tubes as to their action when a blowout thereof occurs, and for this purpose the tubes are provided with means operable to simulate a blowout while the tube is mounted in a tire.

Other objects of this invention will appear hereinafter as the description thereof proceeds, the novel features, arrangements and combinations being clearly set forth in the specification and in the claims thereunto appended.

In the drawings Fig. 1 is a front elevational view partly in section of a device employing our invention;

The present invention relates to a simple demonstrating device for comparing the action of inner tubes, particularly when a blowout occurs. In the instant case our demonstrating device consists of a support for a pair of wheels and rims on which tires are mounted. In these tires tubes of different characteristics are placed, one being an ordinary inner tube and the other being a tube having a blowout safety feature.

Figure 2:
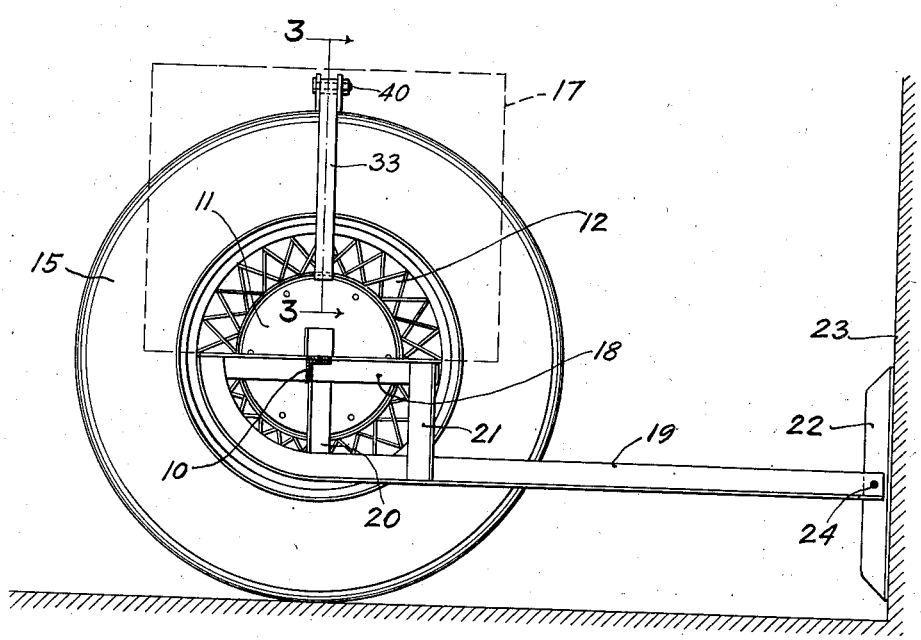
Fig. 2 is a vertical cross-section taken substantially along the line 2—2 of Fig. 1.

In the drawings, the numeral 10 represents a load support, to the ends of which are welded a pair of substantially circular plates 11, only one of which is illustrated. Wheels 12 and 13 are secured to the plates 11 by means of bolts 14. On the rims of these wheels may be mounted in the usual manner the rubber tires 15 and 16. These tires may be of any type adapted to receive an inflatable inner tube. The load support carries a weighting member, such as 17, and in order to give stability to this weighting member we attach to the load-supporting member 10 a cross brace 18, and the load supported on supporting member 10 and cross brace 18 are held from turning movement by means of a long arm 19 curved upwardly at its left-hand end (Fig. 2) and connected to the cross brace 18. Additional braces 20 and 21 complete the rigid structure which supports the weight. The arm 19 is connected to a bracket 22 rigidly fastened to the side of a building or other rigid support such as 23. The arm 19 is pivoted to the bracket 22 at 24 to permit free vertical movement of the support and yet constrain the support to move within certain narrow limits laterally.

In the present instance we have mounted in the tire 15 a safety tube and in the tire 16 a tube of ordinary construction, and the means for simulating a blowout for each tube is substantially identical and each operates in the same manner so that in giving the comparative test the same conditions will prevail.

Figure 3:
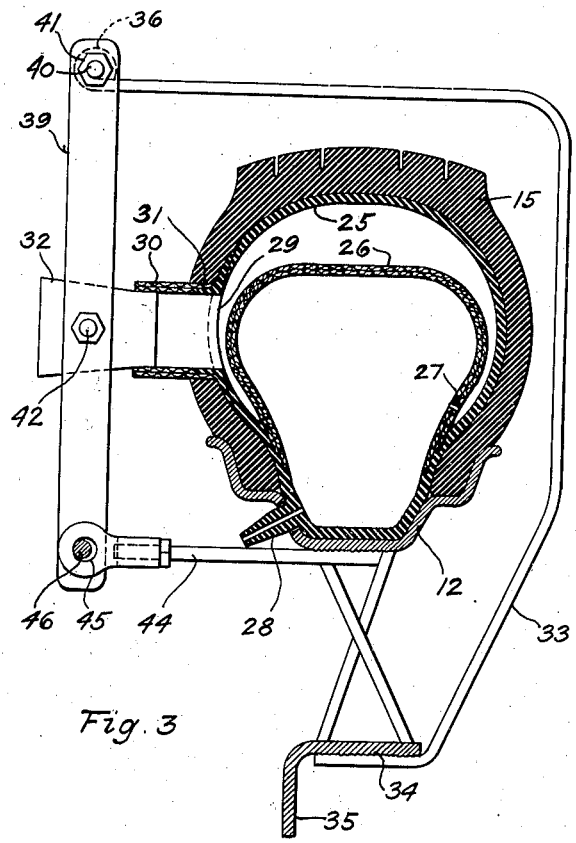
Fig. 3 is a vertical cross-section taken substantially along the line 3—3 of Fig. 2.
Figure 4:
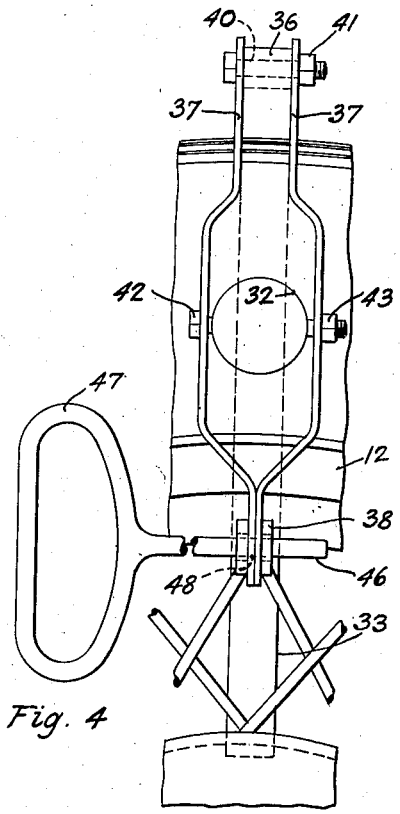
Fig. 4 is a fragmentary side elevational view of the valve mechanism shown in Fig. 3 and looking from the left in that figure.

In Fig. 3 there is illustrated in detail the mechanism for simulating a blowout of the safety tube. In this instance the safety tube comprises the normal tube 25 which fits the inside of the tire 15, and a second smaller inner tube 26 joined to the tube 25 at its base as illustrated quite clearly in the patent to Lee 2,173,065 granted September 12, 1939. The free part of the tube 26 is preferably made inextensible by reinforcing it with fabric or the like. A small opening 27 about the size of a pin hole permits the equalization of the pressures in the tubes 25 and 26, and in case of blowout of either chamber the air leaks slowly from the chamber which is intact so that there is a gradual let-down of the tire after the blowout has occurred, but at the same time permitting a sufficient time in which to stop the vehicle with which it is being used, all as more clearly described in the aforesaid Lee patent. The inflation of these tubes is through the usual valve 28, which herein is not illustrated in detail but includes the usual check valve to prevent the back-flow of air therethrough.

The tube 25 is provided with an enlarged opening 29 at one side and attached to the tube, as by vulcanization, is a hollow cylindrical valve body 30 which progresses through an opening, such as 31, formed in the side of the tire casing 15. The tube 30 may be made of metal but is preferably of flexible inextensible material, such as a short section of reinforced hose, as is used for connections in the cooling system of an automobile.

By closing the outer end of the tube 30 by a valve 32, formed preferably of rubber or the like, the tube 25 can be made to hold air, and both the tubes 25 and 26 may be inflated to the full desired pressure through the valve 28.

To simulate a blowout of the safety tube shown in Fig. 3, it is only necessary to release the valve 32 to permit the air to rush out of the opening 29 through the tube 30. This valve 32 is normally held in place by the following mechanism: a bracket 33 welded, as at 34, to the wheel 35 extends up and over the tire 15 and is provided with an eye 36 at its upper left-hand end, as viewed in Fig. 3. A lever 39 comprising the brackets 37 secured together at their lower ends, as at 38, has an opening aligned with the eye 36, and a bolt 40 extends through the opening in the lever and the eye 36 and is securely locked in place by the nut 41. Any other means for pivoting the lever 39 may be employed and the details of the lever itself are relatively unimportant. Another bolt 42 passes through the lever intermediate its ends and through the valve 32 to provide a pivot for the valve, and a nut 43 holds the bolt in operative position. Sufficient clearance should be provided on either side of the valve 32, so as to permit longitudinal sliding of the valve thereon so that it will fit within the opening 30 if the bracket is not accurately aligned.

A rod such as 44 is secured to the rim 12, as by welding, and is provided at its outermost end with an eye 45. A pin 46 provided with a handle 47 extends through the eye 45 and through a corresponding opening 48 in the lower end of the lever 39.

With the parts so arranged, it will be obvious that the valve 32 is securely held in operative position to close the opening 29 in the tube and, in order to demonstrate the effect of a blowout on this safety tube, it is only necessary to pull out the pin 46, thus permitting the air pressure within the tube to force the valve 32 out of the tube 30, thus producing the effect of a substantial-size blowout. Due to the load 17 which simulates the load normally carried by the wheels of an automobile, the wheel 15 will drop down somewhat and the tire will be partially flattened out, but will be sustained by the air remaining within the tube 26, after which the air in the tube 26 slowly leaks out through the openings 27 and 29 to gradually further deflate the safety tube.

Figure 1:
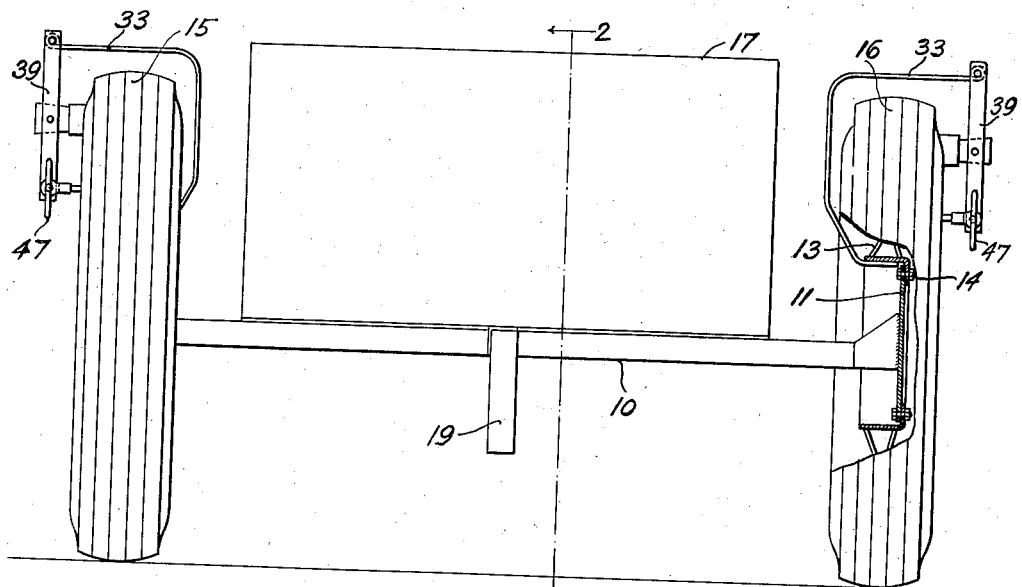

The tire 16 at the right in Fig. 1, which carries the ordinary inner tube 49 inflated by a valve 28, is also provided with a tubular extension 30 mounted on the inner tube and communicating with the opening 19 formed in the inner tube. The opening 29 is closed by a valve 32 in a manner similar to that illustrated in Fig. 3 and to release the air from the inner tube the process is the same as that described with reference to Fig. 3. However, in releasing the air from the tube 49 through the opening 29 a sudden and complete collapse of the tube will result and the tire will immediately go flat, thus illustrating the comparative properties of the safety and regular tube.

Figure 6:
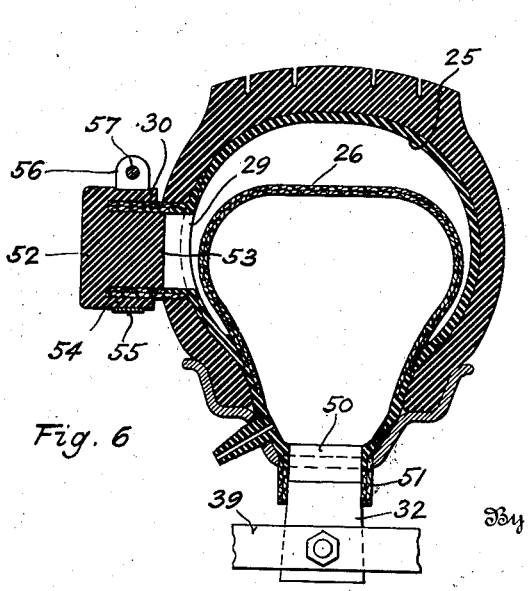
Fig. 6 is a view similar to Fig. 3 illustrating a modification of our invention.
Figure 5:
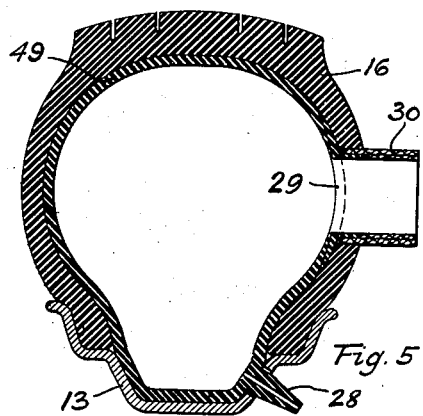
Fig. 5 is a cross-section similar to Fig. 3 but of the tire and tire support at the right in Fig. 1 instead of the tire and support at the left in that figure.

With a safety tube such as shown in Fig. 3, if the inner tube 25 fails, as sometimes happens by a failure of the joined portions of the tubes 25 and 26 at the base, the air within the outer tube 25 will remain and partially sustain the tire 15, so as to avoid complete collapse thereof, and to illustrate this function of the safety tube we may provide in the safety tube an opening 50 in the base thereof and provide this opening with a tubular extension 51 similar to the tubular extension 30 in Figs. 3 and 5, and close this opening with a valve 32 mounted on a lever 39 in a similar manner to that illustrated in Fig. 3. The lever can be conveniently pivoted in any desired manner on the wheel or wheel rim so as to permit the same to pivot in a manner similar to the lever 39. By releasing the valve 32 closing the opening 50 in Fig. 6 and by retaining the air in the tube 25, it is possible to demonstrate the effect of a blowout which destroys the effectiveness of the inner compartment or tube 26.

In demonstrating this last feature of the safety tube it is desirable to close the opening 29 by any suitable means, such as the plug 52, which has a portion 53 fitting within the tubular extension 30 and a portion 54 arranged exteriorly of the tubular portion 30. A ring-type hose clamp 55 embraces the portion 54 of the plug 52 and by drawing the ears 56 of same together, as by a bolt 57 extending therethrough, a firm clamping of the plug 52 is provided and the air may be safely retained within the outer tube 25 when a blowout of the inner tube 26 is simulated by releasing the valve 32 in Fig. 6.

Thus it will be seen that a very simple device has been provided for demonstrating the comparative properties of an ordinary inner tube and that of a safety tube, but it may also be employed to demonstrate other properties of these tubes, or to demonstrate the properties of different types of inner tubes other than the types shown herein. For instance, the device can be used to compare the effectiveness of two different types of safety tubes in the event of a blowout or puncture, as the case may be, and therefore it is not our intention to limit ourselves to the particular device illustrated in the drawings or in the particular arrangement and construction of the parts, except as may hereinafter be set forth in the claims, as it is obvious that various changes within the scope of the claims can be made without departing from the spirit of the invention.

Having thus fully described our invention, what we claim and desire to secure by Letters Patent of the United States is:

1. A demonstrating device comprising a tire support, a tire mounted on said support, an inflatable, flexible tube within said tire, valve means through which said tube may be inflated, said tube having a relatively large opening therein through which air can escape rapidly to simulate a sudden tube failure, a valve for closing said opening to permit inflation of said tube, and means for releasing said valve to permit the air to rush out of the tube.

2. A demonstrating device comprising a tire support, a tire mounted on said support, an inflatable, flexible tube within said tire, valve means through which said tube may be inflated, said tube and tire having relatively large aligned openings therein through which air can escape rapidly to simulate a sudden tube failure, a tubular extension on said tube communicating with said opening in said tube and extending through said opening in said tire, a valve for closing said hollow tube to permit inflation of said tube, and means for releasing said valve to permit the air to rush out of the tube.

3. A demonstrating device comprising a tire support, a tire mounted on said support, an inflatable, flexible tube within said tire, valve means through which said tube may be inflated, said tube having a relatively large opening therein through which air can escape rapidly to simulate a sudden tube failure, a tubular conduit communicating with said opening in said tube and extending through said opening in said tire, a bracket carried by said tire support, a valve pivoted on said bracket, quickly releasable means for holding said valve in position to close the said communicating tube, and releasable to permit the rapid flow of the inflating medium from said first tube.

4. A demonstrating device comprising a tire support, a tire mounted on said support, an inflatable, flexible tube within said tire, valve means through which said tube may be inflated, said tube having a relatively large opening therein through which air can escape rapidly to simulate a sudden tube failure, a tubular conduit communicating with said opening in said tube and extending through said opening in said tire, a bracket carried by said tire support, a valve pivoted on said bracket, quickly releasable means for holding said valve in position to close the said communicating tube, and releasable to permit the rapid flow of the inflating medium from said first tube, said valve including a flexible impervious mass of material adapted to close the end of said communicating tube.

5. A demonstrating device comprising a tire support, a tire mounted on said support, an inflatable, flexible, plural-chambered tube within said tire, said tube having valve means through which said tube may be inflated, separate relatively large openings in at least two of said chambers through which air can escape rapidly to simulate a sudden tube failure, a valve for closing at least one of said openings to permit inflation of said tube, means for releasing said valve to permit the air to rush out of said opening, and means to close the others of said openings.

6. A demonstrating device comprising an air container having a plurality of chambers, means through which said chambers can be supplied with air under pressure, at least one of said chambers having a sufficiently large port in a wall thereof to permit rapid escape of air to the exterior of said container to simulate a blowout, and means for selectively closing or opening said port.

7. A demonstrating device comprising an air container having a plurality of chambers, means through which said chambers may be supplied with air under pressure, at least one of said chambers having a sufficiently large port in a wall thereof, other than a wall thereof common to it and an adjoining chamber, to permit rapid escape of air to the exterior of said container to simulate a blowout, and means for selectively closing or opening said port.

8. A demonstrating device comprising a tire, an inflatable, flexible tube within said tire, means through which air may be supplied to said tube to inflate the same, said tube having a relatively large port therein through which air can escape rapidly to simulate sudden tire failure, and means for selectively opening or closing said port.

9. A demonstrating device comprising a tire support, a tire mounted on said support, an inflatable, flexible tube within said tire, valve means through which said tube can be inflated, said tube having a relatively large port therein through which air can escape rapidly to simulate sudden tire failure, and means for closing or opening said port.

10. A demonstrating device comprising a tire support, a tire mounted on said support, an inflatable, flexible tube within said tire, valve means through which said tube can be inflated, said tube having a relatively large port therein through which air can escape rapidly to simulate sudden tire failure, means for opening or closing said port, and means for loading said support to simulate the load on said tire and tube in actual use.

11. In a demonstrating device, the combination with a pair of wheels, of means connected to both of said wheels to maintain them in substantially fixed, spaced relation with respect to each other, of brackets mounted at the opposed sides of said wheels, each bracket extending upwardly and over the top of the wheel on which it is mounted, then outwardly over and downward beyond the outer faces of the respective wheels, tires mounted on said wheels, tubes within said tires, the respective tires and tubes mounted therein having aligned openings of substantial size to permit rapid escape of air from said tubes to simulate blowouts in said tubes, and separate valve means on each of said brackets movable into and out of position to close the respective openings in said tubes, said valve means and brackets having sufficient clearance with respect to the respective wheels, when in inoperative position, to permit the mounting and dismounting of said tires and tubes on said wheels.

12. A demonstrating device comprising an air container having a plurality of chambers for receiving air under pressure, at least one of said chambers having a sufficiently large port in a wall thereof to permit rapid escape of air to the exterior of said container to simulate a blowout, and means for selectively closing or opening said port.

13. A demonstrating device comprising an air container having a plurality of chambers for receiving air under pressure, at least one of said chambers having a sufficiently large port in a wall thereof to permit rapid escape of air to the exterior of said container to simulate a blowout, means for selectively closing or opening said port, and means for loading the air container to simulate conditions of actual use.

WILLIAM M. BRYAN.
WILLIAM F. PETERS.